March 17, 1942.  J. STUCKI ET AL  2,276,432
GATE
Filed Nov. 17, 1941  4 Sheets-Sheet 1

Inventors
John Stucki
Eda E. Stucki
By Clarence A. O'Brien
Attorney

March 17, 1942. J. STUCKI ET AL 2,276,432
GATE
Filed Nov. 17, 1941 4 Sheets-Sheet 2
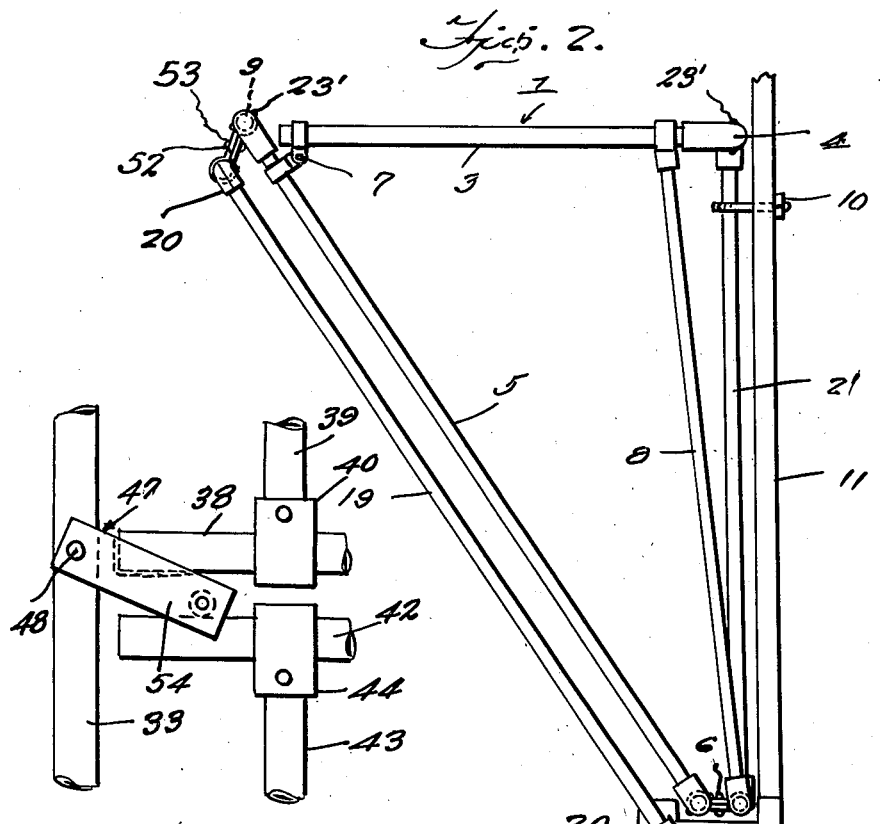
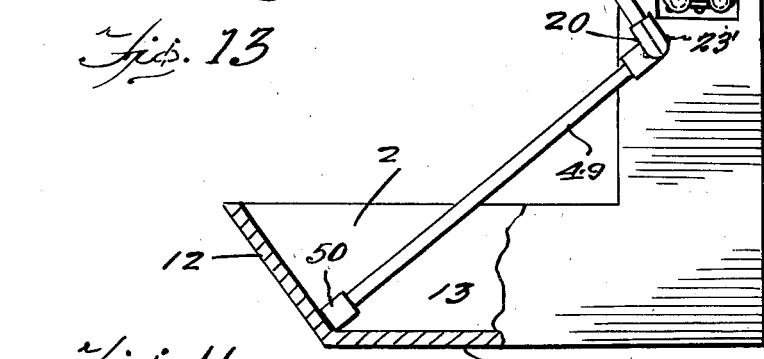
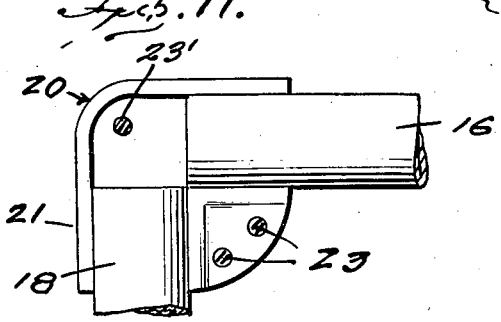
Inventors
John Stucki
Eda E. Stucki
By Clarence A. O'Brien
Attorney,

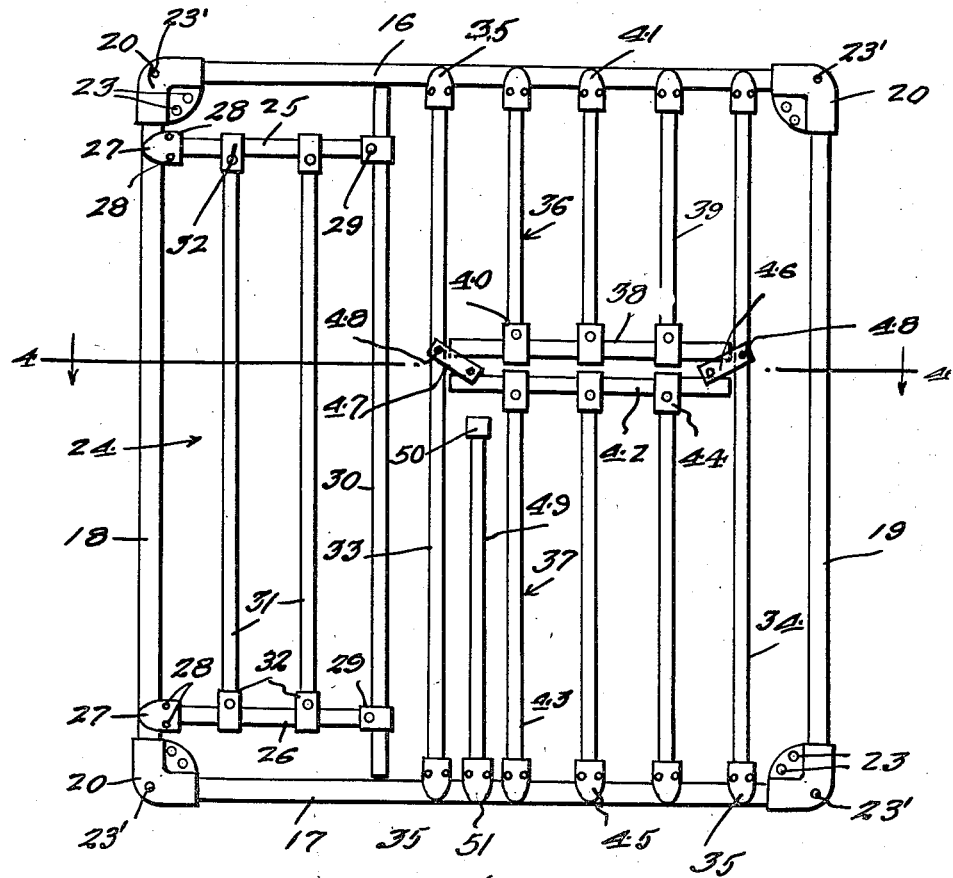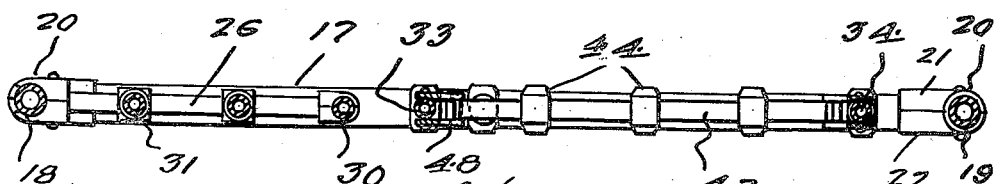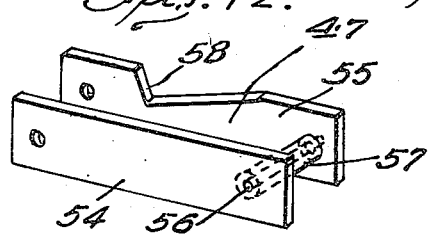

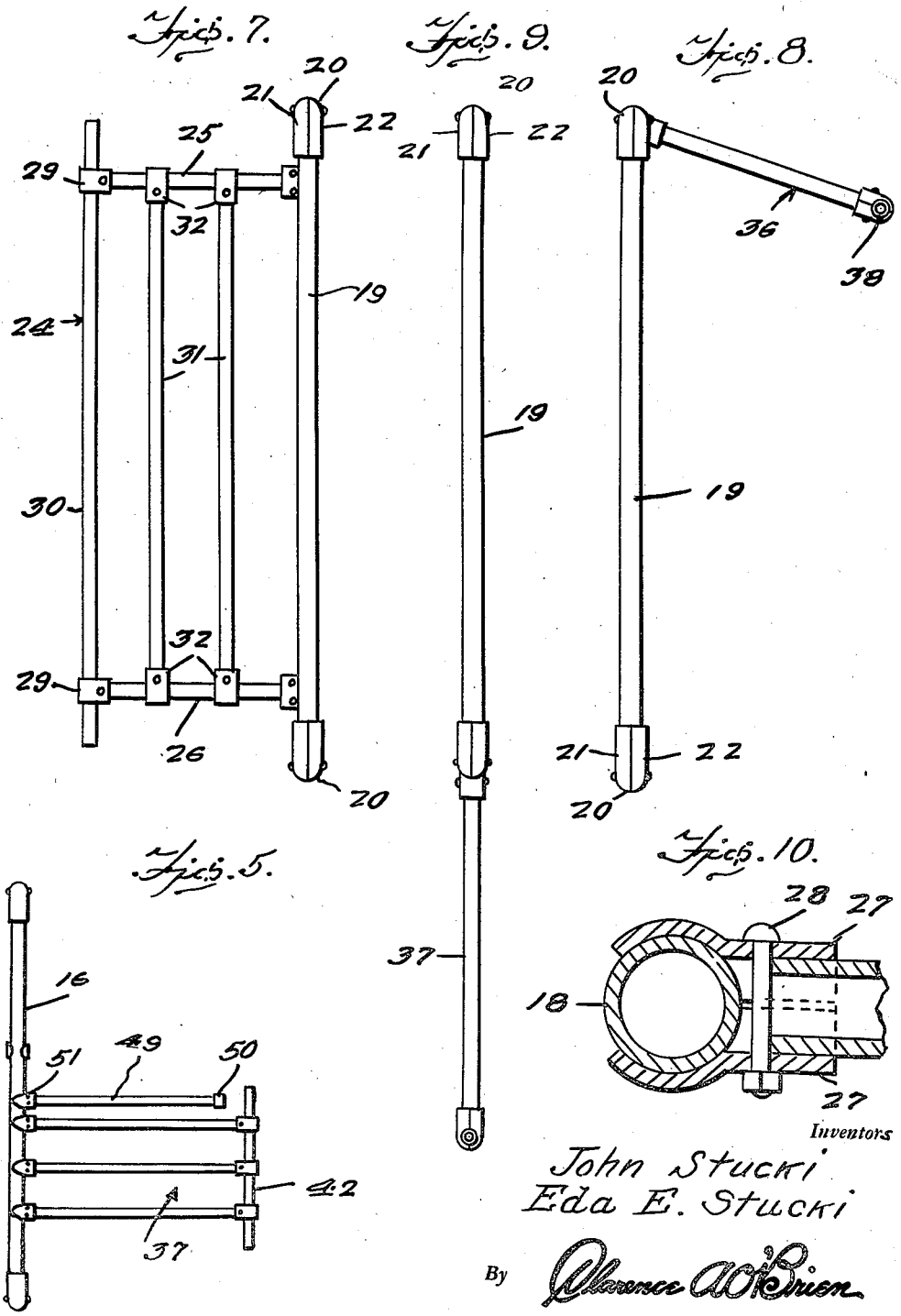

Patented Mar. 17, 1942

2,276,432

UNITED STATES PATENT OFFICE 2,276,432

GATE

John Stucki and Eda E. Stucki, Parkville, Mo.

Application November 17, 1941, Serial No. 419,512

4 Claims. (Cl. 119—59)

Our invention relates to improvements in gates for use more particularly in conjunction with hay racks and ensilage feed troughs, and the like.

The invention is designed with the particular objects in view of providing a simply constructed, strong, practical apparatus for hanging in front of a hay rack over an ensilage feed trough and which is adapted for selective conditioning to force cattle to feed in a predetermined manner such that proper feeding is assured and wastage prevented.

Another object is to provide apparatus of the character and for the purpose above set forth equipped for preventing cattle feeding side by side from horning and injuring each other, and which is easy to install and inexpensive to manufacture.

Other and subordinate objects are also comprehended by our invention, all of which, together with the precise nature of our improvements, will be readily understood when the succeeding description and claims are read with reference to the drawings accompanying and forming part of this specification.

Figure 1:
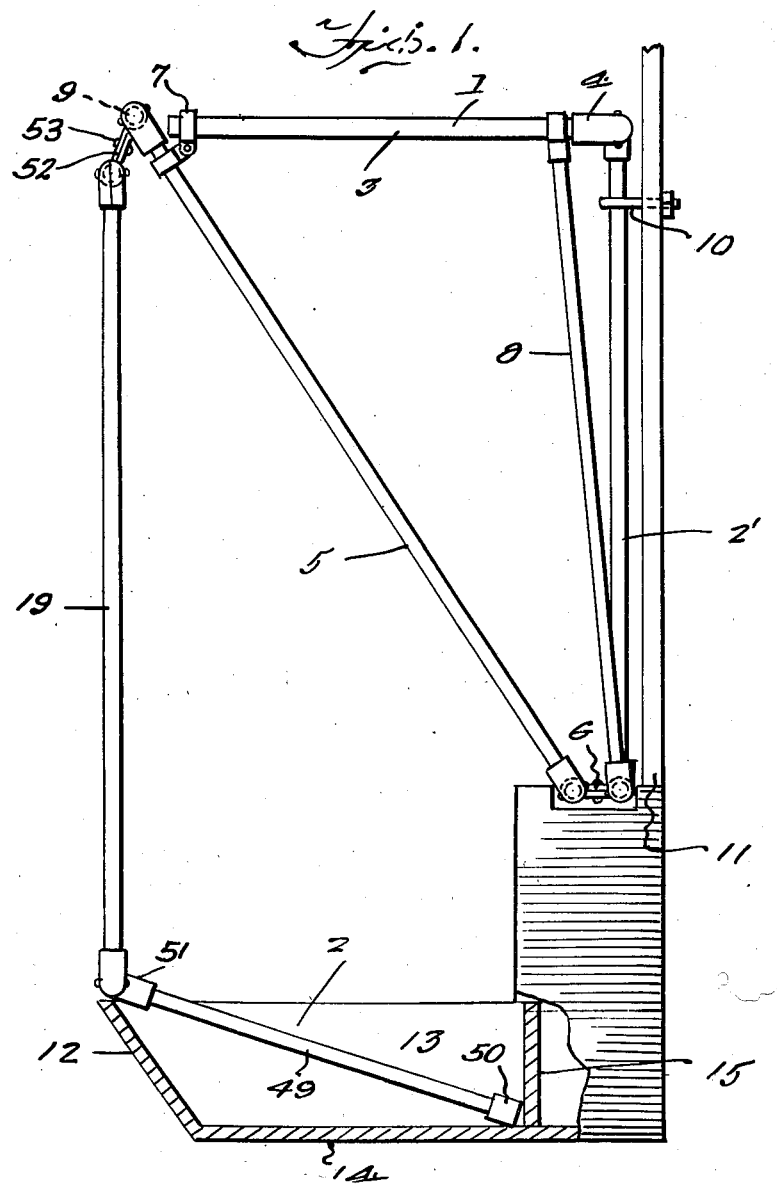
Figure 6:
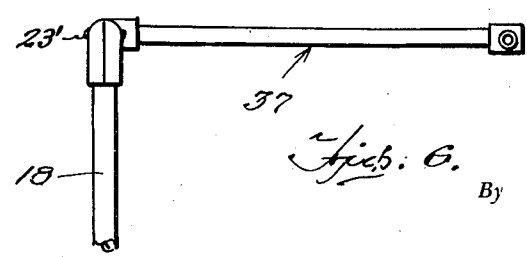

In said drawings:

Figure 1 is a view in end elevation illustrating our improved gate and a preferred application thereof, Figure 2 is a similar view partly in section illustrating the gate swung back, Figure 3 is a view in front elevation illustrating the gate detached, Figure 4 is a view in horizontal section taken on the line 4—4 of Figure 3, Figure 5 is a fragmentary view in top plan illustrating a modified adaptation of the gate, Figure 6 is a view in edge elevation illustrating the adaptation shown in Figure 5, Figure 7 is a view in edge elevation showing the hay feeding gate section swung open, Figure 8 is a view in edge elevation showing the upper loading gate section swung open, Figure 9 is a similar view showing the lower loading gate section swung open, Figure 10 is a view in transverse section taken on the line 10—10 of Figure 11, Figure 11 is a view partly in front elevation and partly in section illustrating one of the elbow fittings, Figure 12 is a view in side elevation of one of the latches, drawn to an enlarged scale, and Figure 13 is a fragmentary view in front elevation illustrating said one latch and the manner in which it coacts with the upper and lower loading gate section.

Referring now to the drawings by numerals, our improved gate has been illustrated therein as forming part of the equipment of a combination feeding unit including a hay rack 1 rising from the rear of an ensilage feeding trough 2.

The hay rack 1 comprises a back structure 2' of vertical tubing, a pair of top side bars 3 extending forwardly horizontally from the back structure and suitably connected to the latter, as at 4, and front rack bars 5 inclining downwardly and rearwardly from the front ends of the upper side bars 3 and suitably connected, as at 6, to the bottom of the back structure 2' and to the upper side bars 3, as at 7. Suitable side braces, as at 8, form part of the equipment of the hay rack 1 and an upper front, horizontal bar represented at 9 in dotted line. The bars 3, 5, 9 and the braces 8 are also formed of tubing. The described hay rack is suitably bolted, as at 10, to an upright structure 11 arising from the rear of the ensilage trough 2. The bar 9, as will be understood, extends parallel with and is vertically aligned with the front wall 12 of the ensilage trough 2.

The ensilage trough 2 may be of any suitable construction, being shown in the present instance, as having ends, as at 13, a flat bottom 14, the beforementioned front wall 12, and a rear wall 15.

The gate comprises a rectangular frame of tubing including a pair of top and bottom members 16, 17 and a pair of similar side members 18, 19. Elbow fittings 20 connect the members 16, 17 to the side members 18, 19, said fittings being longitudinally split into halves, for instance as shown at 21, 22, the halves being bolted together as at 23, 23' to convert the fittings into clamps.

At one side of the described frame of the gate, preferably the left side, is a narrow hay feeding gate section 24 comprising a pair of upper and lower tubular members 25, 26, swingably mounted at rear ends thereof on the frame side bar 18 each by means of a pair of clamps 27 suitably secured to one end of the member, as by a bolt 28, and partially surrounding the side member 18. The front ends of the top and bottom members 25, 26 of said gate section 24 are suitably connected by couplings 29 to a front tubular member 30. Intermediate the member 18 and member 30 of the gate section 24, vertical tubular members 31 are connected to the top and bottom members 25, 26 as by couplings 32. A pair of vertical tubular members 33, 34 extend between the top and bottom members 16, 17, one adjacent the gate section 24 and the other adjacent the side member 19 of the frame. Clamps 35 similar to clamps 27 connect the members 33, 34 rigidly to the members 16, 17. A pair of upper and lower loading gate sections 36, 37 are interposed between the members 33, 34, the upper gate section 36 being preferably shorter than said section 37.

The upper loading gate section 36 comprises a horizontal tubular front member 38, and laterally spaced tubular members 39 having front ends connected to the member 38, as by couplings 40, and rear ends swingably connected to the top member 16 of the frame by clamps 41 similar to clamps 32 and whereby said gate section 36 is vertically swingable on said member 16.

The lower loading gate section 37 comprises a horizontal front tubular member 42 and laterally spaced tubular members 43 having front ends connected to the member 42, as by couplings 44 and rear ends swingably connected to the bottom member 17 of the frame by clamps 45 similar to clamps 41, whereby said lower gate section is vertically swingable on said member 17. The described gate sections 36, 37 are so designed that when they are shut, or closed, the front bars 38, 42 are close together and said sections form a grating between the members 33, 34.

Gravity latches 46, 47 are pivotally mounted, as at 48, on the members 34, 33, respectively, to lock the described gate sections 36, 37 closed, said latch being presently described in detail.

As will now be seen, the gate sections 24, 36 and 37, together with the members 33, 34 form, when said sections are closed, a grating within the confines of the described frame of the gate.

Intermediate the lower loading gate section 37, and the member 33, is a stop leg shorter than the gate section 37 and having the form of a section of tubing 49 having an outer end capped by a suitable crown piece 50 and its inner end connected to the bottom member 17 by a clamp 51 similar to the clamps 32, 41, 45, whereby said leg is swingable on said bottom member 17 into and out of the plane of the frame of the gate. The function of the stop leg will presently appear.

The described gate is suspended from the front bar 9 of the hay rack 1 with the top bar 16 of the gate parallel with said bar 9 and so that said gate may be swung over the ensilage trough 2 inwardly and outwardly toward and from the hay rack 1, respectively. For this purpose, two-part clamps, as at 52, bolted together, as at 53, are provided, the arrangement being such that the parts of said clamps are adjustable about the bar 9 and rotatably support the member 16 of the gate. As best shown in Figures 1 and 2, the described gate is designed to normally hang over the top edge of the front wall 12 of the ensilage trough 2 in a vertical plane, but, may be swung rearwardly parallel with the front bars 5 of the hay rack 1. In this connection, it is to be noted, that the described gate is of the required height so that when it is swung rearwardly, as described, it will block access, by cattle, to the hay rack 1. The described stop leg 49 is so designed that in the normal vertical position of the gate, it may be swung inwardly and downwardly into the ensilage trough 2 with its front end abutting the rear wall 15 of said trough whereby the gate is prevented from being swung inwardly. Also said stop leg 49 is so arranged that when the gate is swung inwardly substantially parallel with the front bars 5 of the hay rack 1, said leg may be swung outwardly and downwardly, forwardly with its front end abutting the front wall 12 of said trough, whereby the gate is held in rearwardly swung position.

Referring now to the use and operation of the invention, normally the gate is swung forwardly into the described vertical position over the front wall 12 of the ensilage trough 2. In this position of the gate, the ensilage trough 2 may be loaded with ensilage, or other food, by opening either the upper loading gate section 36 or the lower loading gate section 37, the section 36 being swung inwardly to open the same, and the section 37 swung outwardly and downwardly for opening. If it is desired that the ensilage in the ensilage trough 2 shall be fed first, with the upper and lower loading gate sections 36, 37 closed, also the hay feeding section 24, the gate is swung rearwardly, into the position shown in Figure 2, and the stop leg 49 swung to lower the front end thereof into the trough 2 and against the front wall thereof to hold the gate in inwardly swung position. In this position of the gate, the cattle have access to the ensilage in the ensilage trough 2 but are prevented from feeding from the hay rack 1. Now if it is desired to feed hay, the gate may be swung forwardly into normal position and blocked from rearward swinging by lowering the stop leg 49 into the ensilage trough 2 with its front end abutting the rear wall 12, and the hay feeding gate 24 opened out at right angles to the frame. The cattle may now have access to the hay rack 1. In this connection it is to be noted that the outswung hay feeding gate section 24 is designed to form a partition preventing cattle feeding from injuring those feeding from an adjacent rack, for instance by horning the same. The upper gate section 36 is particularly designed to permit loading from a wagon, and the lower loading gate section 37 to permit loading from the ground. Also, the lower loading gate section 37 may be utilized for cleaning out the ensilage trough 2, in which operation said section 37 may be swung outwardly and downwardly as shown in Figure 9.

In equipping the hay rack 1 for the feeding of bulls therefrom, which animals have a propensity to toss hay and ensilage upwardly, the described gate is detached from the clamps 43 and inverted and reattached to position the gate section 37 uppermost. Said gate section 37 may then be swung upwardly and rearwardly over the hay rack 1, the clamps 52 being suitably adjusted to permit this operation. In this position of the gate section 37, it blocks throwing of hay upwardly through the rack and thereby saves feed. The bulls may be permitted to feed through the opened gate section 37, or, the now lowermost gate section 36 may be swung downwardly to permit feeding therethrough. In this described use of the gate, the stop leg may be swung to an out-of-the-way position. In Figures 5 and 6 the described use of the gate is clearly illustrated.

The latches 46, 47 each comprise a pair of front and rear elongated plates 54, 55 connected together in side-by-side spaced apart relation by a transverse stud 56 at one end of said plates having a roller 57 thereon. The latches 46, 47 are mounted on the members 34, 33, respectively, to swing vertically therein by means of the pivots 48 passing through the ends of the latch plates 54, 55 opposite the connected ends of said plates and through the members 34, 33. In the normal position of the gate, that is, when it is not inverted, the latches 46, 47 incline downwardly from the members 34, 33 under the influence of gravity with the plates 54, 55 thereof straddling the opposite ends of the front member 42 of the lower loading gate section and the rollers 57 resting on said member whereby said section is locked but may be unlocked by lifting of said latches. The rear plate 55 of each latch 46, 47 is notched, as at 58, so that in the described locking position of said latches the rear plates 55 clear the ends of the front member 38 of the upper loading gate section 36 and said section 36 is unlocked as far as inward swinging is concerned. When the gate is inverted as in feeding bulls, the latches 46, 47 swing under the influence of gravity into straddling relation to the front member of the upper gate loading section 36 and into unlocking position relative to lower loading gate section 37.

The foregoing will, it is believed, suffice to impart a clear understanding of our invention without further explanation.

Manifestly, the invention, as described, is susceptible of modification without departing from the inventive concept, and right is herein reserved to such modifications as fall within the scope of the subjoined claims.

What we claim is:

1. The combination with a feed trough having front and rear sides, respectively, and a hay rack upstanding from the rear side of said trough and having a front inclining upwardly and forwardly, of a gate structure including a rectangular frame coextensive in width with the length of said trough, means swingably suspending said frame from the upper front edge of said rack to normally hang vertically over the front side of the trough parallel therewith and thereby block access to said trough and rack, said gate being swingable rearwardly to clear the top of the trough and into a plane parallel with the front of said rack to permit access to said trough and block access to said rack, and means coacting with opposite sides of said trough to lock the gate structure rearwardly and forwardly, respectively.

2. The combination with a feed trough having front and rear sides, respectively, and a hay rack upstanding from the rear side of said trough and having a front inclining upwardly and forwardly, of a gate structure including a rectangular frame coextensive in width with the length of said trough, means swingably suspending said frame from the upper front edge of said rack to normally hang vertically over the front side of the trough parallel therewith and thereby block access to said trough and rack, said gate being swingable rearwardly to clear the top of the trough and into a plane parallel with the front of said rack to permit access to said trough and block access to said rack, and means coacting with opposite sides of said trough to lock the gate structure rearwardly and forwardly, respectively, said means comprising a pivoted stop leg on said gate structure manipulative into abutting positions relative to said sides of said trough.

3. The combination with a feed trough having front and rear sides, respectively, and a hay rack upstanding from the rear side of said trough and having a front inclining upwardly and forwardly, of a gate structure including a rectangular frame coextensive in width with the length of said trough, means swingably suspending said frame from the upper front edge of said rack to normally hang vertically over the front side of the trough parallel therewith and thereby block access to said trough and rack, said gate being swingable rearwardly to clear the top of the trough and into a plane parallel with the front of said rack to permit access to said trough and block access to said rack, and means coacting with opposite sides of said trough to lock the gate structure rearwardly and forwardly, respectively, said gate structure comprising a feeding gate section at one side thereof for opening in the normal position of said structure to permit access to said trough and rack and forming in the open position thereof a partition between said gate structure and one adjoining the same.

4. The combination with a feed trough having front and rear sides, respectively, and a hay rack upstanding from the rear side of said trough and having a front inclining upwardly and forwardly, of a gate structure including a rectangular frame coextensive in width with the length of said trough, means swingably suspending said frame from the upper front edge of said rack to normally hang vertically over the front side of the trough parallel therewith and thereby block access to said trough and rack, said gate being swingable rearwardly to clear the top of the trough and into a plane parallel with the front of said rack to permit access to said trough and block access to said rack, and means coacting with opposite sides of said trough to lock the gate structure rearwardly and forwardly, respectively, said gate structure comprising a feeding gate section at one side thereof for opening in the normal position of said structure to permit access to said trough and rack and forming in the open position thereof a partition between said gate structure and one adjoining the same, and a pair of upper and lower gate sections at the opposite side of said gate structure for use in loading feed into said trough from different levels, and opening upwardly and downwardly, respectively, to prevent interference one with the other.

JOHN STUCKI.
EDA E. STUCKI.